United States Patent [19]

Ortiz, Jr.

[11] Patent Number: 5,142,600
[45] Date of Patent: Aug. 25, 1992

[54] OPTICAL FIBER QUICK CONNECT/DISCONNECT FOR A POWER LASER

[75] Inventor: Angel L. Ortiz, Jr., Scotia, N.Y.

[73] Assignee: General Electric Company, Schenectady, N.Y.

[21] Appl. No.: 660,068

[22] Filed: Feb. 25, 1991

[51] Int. Cl.[5] .............................................. G02B 6/42
[52] U.S. Cl. ........................................ 385/83; 385/88
[58] Field of Search ............. 350/96.20, 96.15, 96.21, 350/96.22; 385/82, 83, 84, 88

[56] References Cited

U.S. PATENT DOCUMENTS

| | | | |
|---|---|---|---|
| 4,295,043 | 10/1981 | Eibner et al. | 250/227 |
| 4,407,562 | 10/1983 | Young | 350/96.20 |
| 4,445,753 | 5/1984 | Collignon | 385/84 X |
| 4,531,810 | 7/1985 | Carlsen | 350/96.20 |
| 4,707,073 | 11/1987 | Kocher | 350/96.23 |
| 4,718,744 | 1/1988 | Manning | 350/96.20 |
| 4,732,450 | 3/1988 | Lee | 350/96.18 |
| 4,744,627 | 5/1988 | Chande et al. | 350/96.20 |
| 4,753,521 | 6/1988 | Deserno | 350/465 |
| 4,779,948 | 10/1988 | Wais et al. | 360/96.20 |
| 4,868,361 | 9/1989 | Chande et al. | 219/121.62 |
| 4,958,900 | 9/1990 | Ortiz, Jr. | 350/96.18 |
| 4,962,991 | 10/1990 | Carvalho | 350/96.20 X |

Primary Examiner—John D. Lee
Assistant Examiner—Phan T. Heartney
Attorney, Agent, or Firm—James E. McDaniel; James C. Davis, Jr.; Paul R. Webb, II

[57] ABSTRACT

This invention discloses an optical fiber connect/disconnect for power lasers. The connect/disconnect should allow a laser/fiber user to quickly interface fiber injection input and fiber output couplers while providing an audible and visual optical alignment. The connect/disconnect also offers fiber end protection against dust and mechanical damage.

10 Claims, 3 Drawing Sheets

OPTICAL FIBER QUICK CONNECT/DISCONNECT FOR A POWER LASER

BACKGROUND OF THE INVENTION

This invention relates to high power laser systems of the type which, typically, operate at over 500 watts and up to several hundreds of Joules that have optical fiber assemblies which are constructed of several individual pieces in order to form a quick connection/disconnection. Such structures of the type, as described more completed in the following description of the invention, generally allow a laser/fiber user to quickly interface injection input and fiber output couplers while providing "snap in" optical alignment. In particular, an optical fiber for use in a power laser is secured to a quick connect/disconnect main body and the main body is inserted into a quick connect/disconnect main body receiver such that the main body is "locked" into the receiver. The receiver, typically, is connected to a fiber input or output coupler. This invention, particularly, relates to certain unique optical fiber connections for a power laser and the connection/disconnection means in association therewith.

Prior to the present invention, as set forth in general terms above and more specifically below, it was known, in lower power communication systems and high power laser transmission systems, to make use of optical fiber holders. Exemplary of the low power communication type fiber holders are U.S. Pat. Nos. 4,531,810; 4,753,521; and 4,718,744, respectively entitles "Optical Fiber Holders", "Lens System for Focusing a Divergent Laser Beam", and "Collimating Lens an Holder For An optical Fiber" which disclose fiber holders that, typically, require potting or adhering of the optical fiber into ceramic, metallic or plastic ferrules. While these systems adequately hold the optical fiber, these systems, typically, do not allow for high power laser beam injection or do they quickly disconnect without mechanically loosening the fastening devices, usually set screws. Also, the "potting" of the fiber does not efficiently lend itself to field repair, in that the fiber becomes permanently bonded to the older and cannot be readily removed from the holder if the fiber is damaged. Finally, the fiber optic connectors developed for low power applications usually cannot be employed in high power applications because the higher power can adversely affect and can be severely damaged due to the burning of the mechanical means of the low power fiber connector.

Also, high power laser transmission fiber systems, as exemplified in U.S. Pat. Nos. 4,707,073 and 4,732,450, typically, do not quickly disconnect without mechanically loosening the fastening device, usually, set screws, and, also, require the fiber to be "potted" in place. Other high power fiber holders such as U.S. Pat. Nos. 4,744,627, 4,868,361, and 4,958,900 respectively entitled "Optical Fiber Holder", "Coupling Device For High Power Laser Transmitting Optical Fibers", and "Multi-Fiber Holder For Output Coupler and Methods Using Same" and all assigned to the same company, namely the General Electric Company, as the present invention, described fiber holders using a groove however do not describe or teach quick connectors/disconnectors. For example, if the fiber is potted in place and an inadvertent torsional stress is placed on the holder, this stress may be transferred to the fiber and may adversely affect the mechanical and optical transmission characteristics of the fiber. Consequently, a more advantageous optical fiber disconnect system, then, would be presented if such amounts of mechanical loosening could be reduced while still employing a high power laser transmission system.

It is apparent from the above that there exists a need in the art for a high power laser optical fiber connect/disconnect system which will adequately hold the fiber, and which at least equals the transmission characteristic of known fiber holding systems, but which at the same time allows for the fiber to be quickly and easily connected/disconnected to or from the input or output coupler. It is a purpose of this invention to fulfill this and other needs in the art in a manner more apparent to the skilled artisan, once given the following disclosure.

SUMMARY OF THE INVENTION

Generally speaking, this invention fulfills these needs by providing an optical fiber connect/disconnect for a power laser which is comprised of a main body means adapted to releasably secure an optical fiber means, a main body receiver means, a coupler means secured to said receiver means, and said main body means releasably engaging said receiver means in order to substantially create a fiber optical path through said body means, said receiver means and said coupler means.

In certain preferred embodiment, the optical fiber is connected to the main body by threaded fasteners and clamps. Also, the main body receiver contains a switch to determine when the main body is fully seated in the receiver. Finally, a spring means in the receiver and a mating groove in the main body are used to seat the main body in the receiver.

In another further preferred embodiment, the main body and the main body receiver can be quickly and easily connected/disconnect such that undue torsional stresses upon the optical fiber can be avoided.

In particularly preferred embodiments, the optical fiber connect/disconnect system of this invention consists essentially of an optical fiber releasingly connected at one end to a main body and a main body receiver connected to a coupler such that when the main body is inserted into the receiver and releasably engages the receiver, an optical fiber connection is formed between the optical fiber and the coupler. A precise optical alignment between the optical fiber and input or output coupler is established.

The preferred optical fiber disconnect, according to this invention, offers the following advantages: ease of disconnection and connection; good stability; good durability; excellent field repairability characteristics; excellent optical alignment between input and/or output coupler; good economy; and high strength for safety. In fact, in many of the preferred embodiments, these factors of ease of disconnect and connect, maintenance characteristics and optical alignment are optimized to an extent considerably higher than heretofore achieved in prior, known fiber connectors.

BRIEF DESCRIPTION OF THE DRAWINGS

These and other objects of the present invention, together with further features and advantages thereof, will become apparent from the following detailed specification when read together with the accompanying drawings, in which.

DETAILED DESCRIPTION OF THE INVENTION

Figure 1:
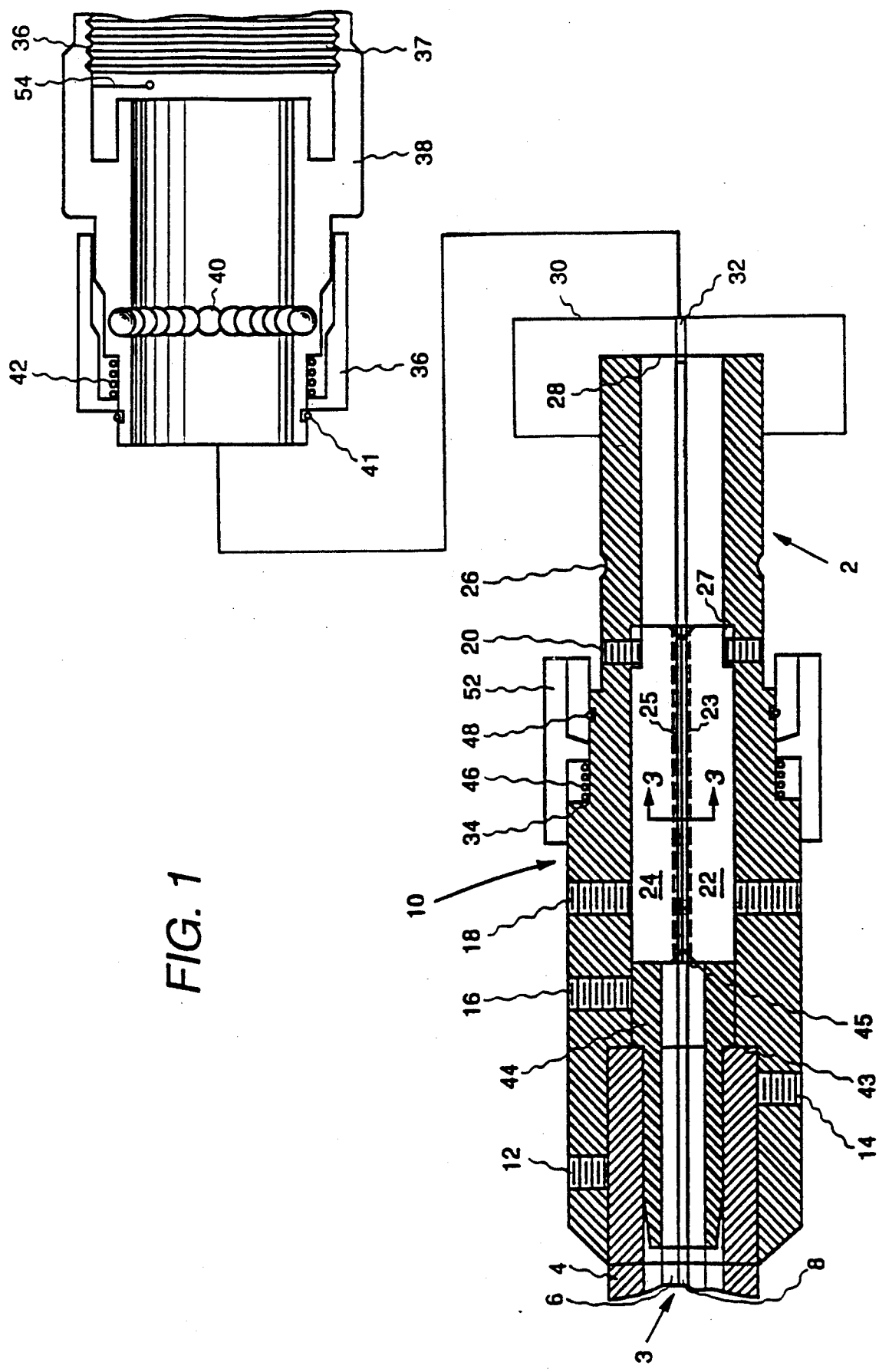
FIG. 1 is a side plan view of an optical fiber quick connect/disconnect, with the component parts disconnected according to the present invention.
Figure 2:
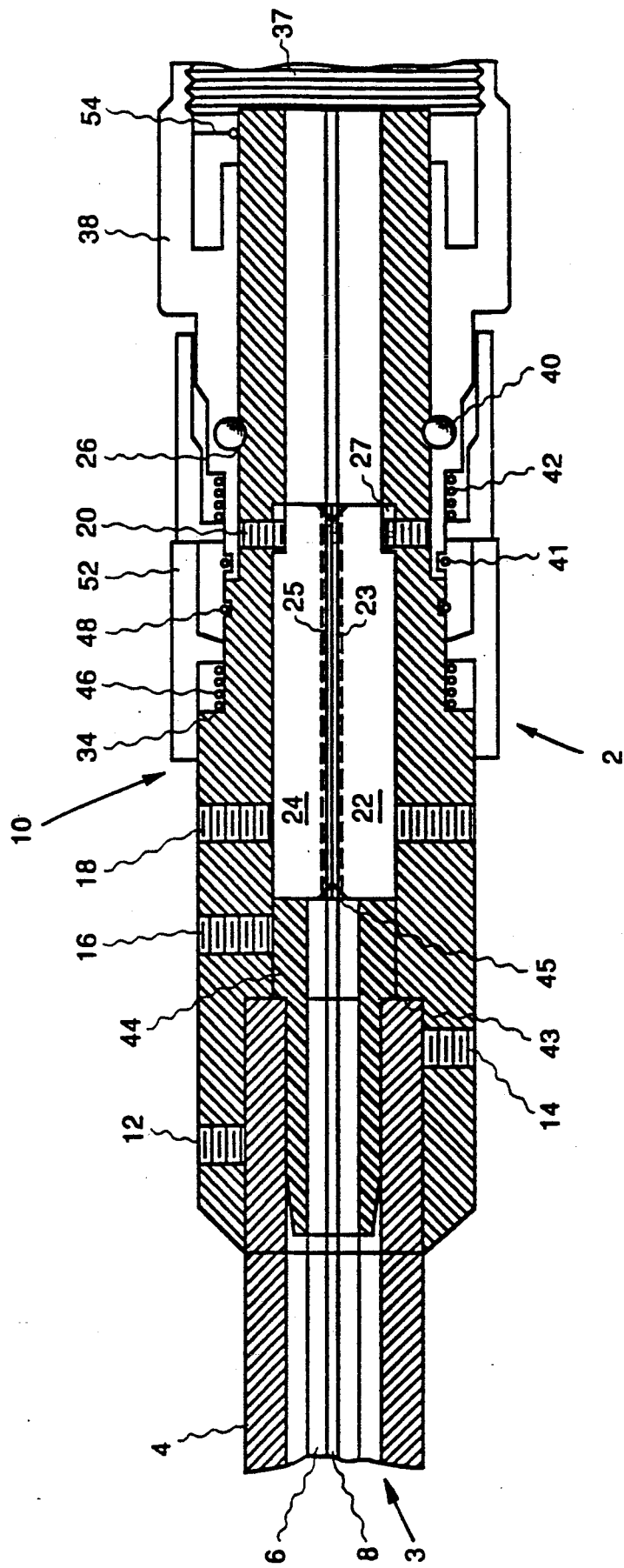
FIG. 2 is a side plan view of the optical fiber connect/disconnect main body with the components parts connected, according to the present invention.

With reference first to FIGS. 1 and 2, optical fiber quick connect/disconnect assembly 2 is shown. One end of an optical fiber 3 is placed inside of housing 10. Housing 10, preferably, is constructed of non-magnetic stainless steel.

Optical fiber assembly 3, preferably, is constructed of ¼ inch Sealtite ® armor cable 4 which is manufactured by Anaconda. Tubing 6, preferably, constructed of ⅛ Polyflo ® tubing and manufactured by Imperial Eastman is placed inside of cable 4. Fiber 8, preferably, a polymer or glass-clad fiber, manufactured under the tradename Anhydraguide ® fiber by Fiberguide Industries, is located within tubing 6.

Cable 4 terminates at notch 43 in housing 10. Cable 4 and sections of tubing 6 and fiber 8 are rigidly secured in housing 10 by fasteners 12,14. Fasteners 12,14, preferably, are conventional, steel set screws having a hex socket head. Preferably, there are three fasteners 12 set approximately 120 degrees apart. Likewise, three fasteners 14 are set approximately 120 degrees apart.

Tubing 6 terminates at end 45 of clamp 44 in housing 10. Clamp 44, preferably, is constructed of nylon. Clamp 44, the remaining section of tubing 6 and a section of fiber 8 are rigidly secured in housing 10 by fasteners 16. Fasteners 16, preferably numbering three, are conventional steel set screws having a hex socket head and are set approximately 120 degrees apart. However, it is to be understood that due to the very close tolerances between claim 44 and cable 4, fasteners 16 may not be needed.

Figure 3:
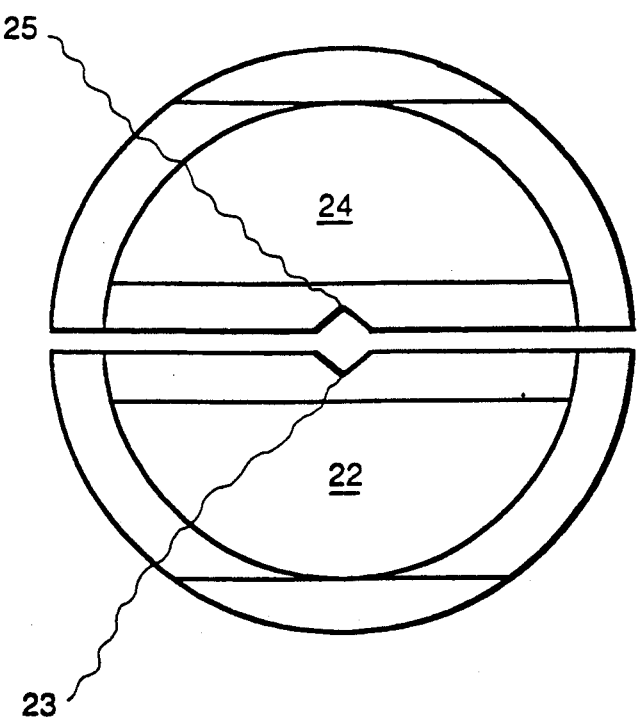
FIG. 3 is an end view drawing of the fiber holder, taken along line 3—3 in FIG. 1, according to the present invention.

Another further section of fiber 8 is rigidly secured in fiber holders 22,24. Fiber holders 22,24, are constructed of fused silica and are machined by conventional machining techniques to create longitudinal grooves 23,25 (FIG. 3) whereby fiber 8 is located and retained. The machining tolerances between the fiber diameter, fiber holders and housing are such that when assembled, the fiber is gently squeezed such that there are no effects to the fiber transmission characteristics. Fiber holders 22,24 and fiber 8 are rigidly secured in housing 10 by threaded fasteners 18,20. Threaded fasteners 18,20, preferably, are conventional soft tip, steel set screws having a hex socket head. The end of fiber holders 22,24 abut against notch 27 in housing 10.

The remaining length of fiber 8 is located, preferably, about ⅞" beyond fiber holders 22,24 and within housing 10. Preferably, the end of fiber 8 should be located several millimeters inside of hole 28 in housing 10. Fiber 8 is located away from hole 29 and inside housing 10 in order to protect fiber 8 from dust and to keep the end of fiber 8 from being damaged.

After cable 4, tubing 6 and fiber 8 are rigidly secured in housing 10, fiber target 32 is placed against hole 28 in housing 10 (FIG. 1). Target 30, preferably, is constructed of Lexan ®, manufactured by the General Electric Company. The end of fiber 8 should be located such that it is aligned with hole 32 in target 30. If fiber 8 is not in alignment with hole 32, fasteners 18 or 20 may be maneuvered by conventional techniques until fiber 8 si in alignment with hole 32. Target 30 is removed once proper alignment of fiber 8 is achieved. It is to be understood that the proper mechanical and optical alignment of fiber 8 with respect to hole 28 should ensure that when housing 10 is inserted into and releasably engages housing receiver 34, fiber 8 should be in proper mechanical and optical alignment for the coupling device 37 which is connected to receiver 34.

Located on the outside of housing 10 is knob 52, spring 46 and spring clip 48. Knob 52, preferably, is knurled by conventional techniques and is constructed of nonmagnetic, stainless steel. Spring 46 and spring clip 48, preferably, are constructed of spring steel. Knob 52 should act as a protector for groove 26 in housing when spring 46 is extended such that knob 52 extends over groove 26 (FIG. 2). Spring clip 48 is a conventional biasing spring for keeping knob 52 in engagement with housing 10.

Housing receiver 34, preferably, is constructed of non-magnetic, stainless steel. End cap 36, preferably, knurled on its outer periphery by conventional machining techniques, and constructed of non-magnetic stainless steel is secured to receiver 34 by conventional fasteners 41. End cap 36, is biased by a conventional spring 42 so that end cap 36 will protect the end of receiver 34 when receiver 34 is not engaged with housing 10.

Located within receiver 34 are ball bearings 40. Ball bearings 40 are biased within receiver 34 by conventional biasing means such that when housing 10 is inserted into receiver 34, ball bearings 40 "snap" into and mate with groove 26 in housing 10 to lockingly retain housing 10 in receiver 34. It is to be understood that while ball bearings are disclosed, other biasing devices such as wedges can also be used. The criteria for such biasing means being that they must "snap" into and mate with groove 26 and adequately retain housing 10 in locking engagement with receiver 34. The tolerances between housing 10 and receiver main body provide, preferably, less than or equal to 0.0005 inches thereby allowing optical alignment when assembling. Likewise, housing 10 may rotate about its centerline axis and should remove torsional stresses between the housing 10 and receiver 34.

Switch assembly 54 is located within receiver. Switch assembly, preferably, is a conventional microswitch interlock assembly. In particular, when housing 10 is inserted into receiver 34, an end of housing 10 should contact switch assembly 54 and engage the switch 54. When housing 10 engages switch assembly 54, a signal is sent from switch assembly 54 to an operator control panel (not shown) which indicates that housing 10 and receiver 34 should be properly connected. Conversely, when housing 10 and receiver 34 are disconnected, switch assembly 54 should send a signal which should indicate such a condition. Switch assembly 54 also prevents the operator from removing housing 10 during high power laser transmission because switch 54 should be electrically connected to the operator panel (not shown) and laser interlock (not shown) so that it should automatically cut off the high power laser transmissions when housing 10 is removed from receiver 34. In this manner, the operator gets a visual and an audio signal that housing 10 and receiver 34 are connected because microswitch assembly 54 should provide a visual check of the connection and the "snapping" of ball bearings 40 into groove 25 should provide an audio signal of the connection.

In operation, as housing 10 is inserted into receiver 34, ball bearings 40 are loosened when spring loaded caps 36 are compressed. Full connection should be completed when ball bearings 40 "snap" into groove 26 after which the spring loaded caps 36 spring back maintaining ball bearing pressure in groove 26 thus locking housing 10 and receiver 34 in place. After a full connection is made, small micro switch 54 (FIG. 1) within receiver 34 completes a safety interlock to the laser system thus allowing operation. Again, the safety interlock is violated by removing housing 10 from the input or output coupler during high power laser transmissions. A conventional laser emergency stop is initiated by the opening of micro switch thus shutting the laser system down.

Once given the above disclosure, many other features, modifications and improvements will become apparent to the skilled artisan. Such features, modifications and improvements are, therefore, considered to be a part of this invention, the scope of which is to be determined by the following claims.

What is claimed is:

1. An optical fiber connect/disconnect for a power laser which is comprised of:
   a main body means adapted to releasably secure an optical fiber means;
   a main body receiver means;
   a slidable coupler means secured to said receiver means; and
   said main body means releasably locking to said receiver means in order to optically connect said main body means, said receiver means and said coupler means wherein said main body is comprised of a groove located substantially on a circumferential surface of said main body and a slidable protection means with substantially protects said groove.

2. The optical fiber connect/disconnect for a power laser, according to claim 1, wherein said optical fiber means is further comprised of:
   an armor cable means;
   a tubing means; and
   a fiber means, wherein said fiber means is located substantially within said tubing means and said tubing means is substantially located within said armor cable means.

3. The optical fiber connect/disconnect for a power laser, according to claim 1, wherein said main body means is further comprised of:
   a fastening means;
   a clamp means;
   a fiber holder means; and
   a fiber alignment means.

4. The optical fiber connect/disconnect for a power laser, according to claim 2, wherein said fastening means contacts said fiber means, said clamp means and said fiber holder means.

5. The optical fibers connect/disconnect for a power laser, according to claim 3, wherein said fiber alignment means is further comprised of:
   a target means having a hole located substantially in the center of said target means;and
   an adjustment means such that said adjustment means substantially aligns said fiber means with said hole in said target means.

6. The optical fiber connect/disconnect for a power laser, according to claim 1, wherein said main body is further comprised of:
   an actuation means located substantially adjacent said groove.

7. The optical fiber connect/disconnect for a power laser, according to claim 5, wherein said main body receiver is further comprised of:
   a spring means; and
   an indicator means.

8. The optical fiber connect/disconnect for a power laser, according to claim 7 wherein said indicator means is further comprised of:
   a microswitch interlock assembly means.

9. The optical fiber connect/disconnect for a power laser, according to claim 4, wherein said fiber holder means is further comprised of:
   at least two cylinder holders having grooves located along a lengthwise dimension of said cylindrical holders such that when said fiber means is placed between said cylinder holder means a fiber means is gently squeezed such that there is substantially no effect to a fiber transmission characteristic.

10. A method for connecting an optical fiber for a power laser to a coupler with an optical fiber means having an end, a main body means including a groove releasably securable to said end of said fiber means, and a main body receiver means including a spring means and an indicator means which is comprised of the steps of:
    inserting said main body means into said main body receiver means;
    loosening said spring means in said main body receiver means; and
    substantially simultaneously engaging said spring means in said groove and contacting said indicator means with said main body means to create a releasably lockable connection between said optical fiber means and said coupler means which can be detected both audibly and visually, and where said main body means in said receiver means are allowed to rotate about their centerline axes.

* * * * *